Dec. 18, 1951 R. K. BOYER ET AL 2,579,359
DEVICE FOR TESTING AIR LINE PRESSURE GAUGES
Filed Aug. 16, 1949
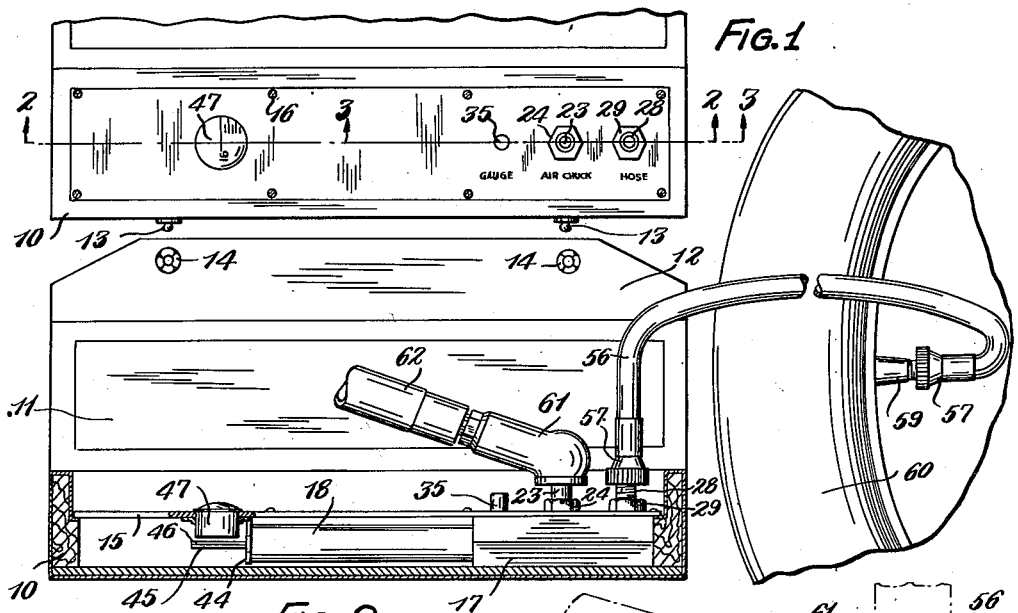
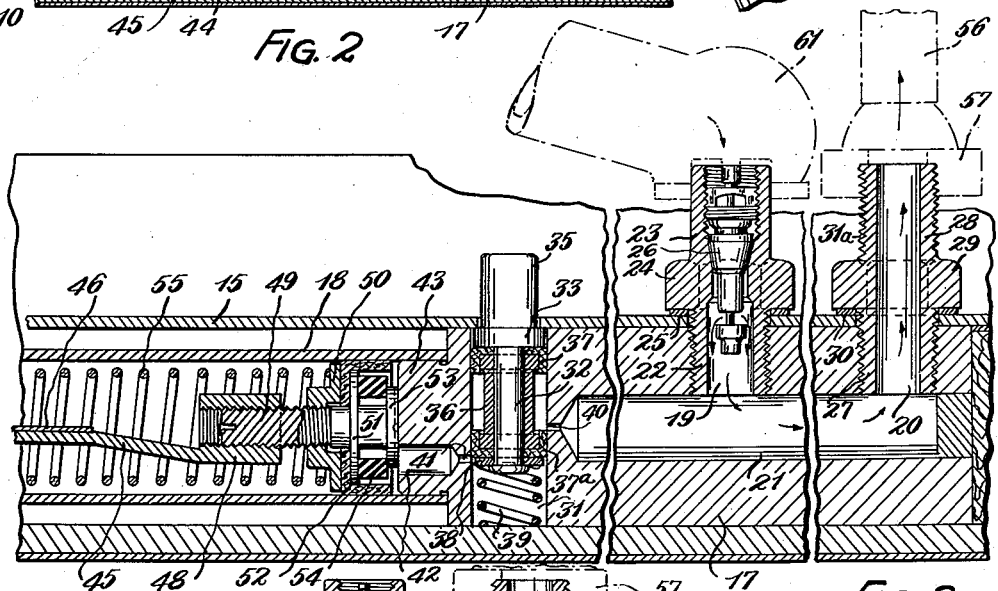
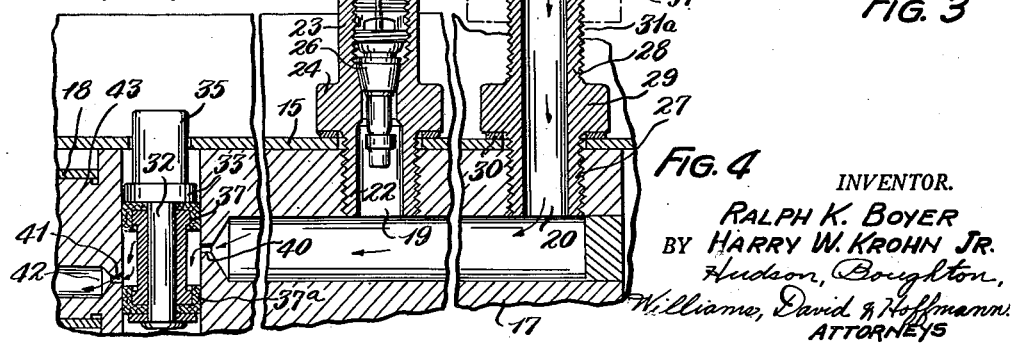
INVENTOR.
RALPH K. BOYER
BY HARRY W. KROHN JR.
Hudson, Boughton,
Williams, David & Hoffmann
ATTORNEYS Patented Dec. 18, 1951

2,579,359

UNITED STATES PATENT OFFICE 2,579,359

DEVICE FOR TESTING AIR LINE
PRESSURE GAUGES

Ralph K. Boyer, Lakewood, and Harry W. Krohn, Jr., Cleveland, Ohio, assignors to The Dill Manufacturing Company, Cleveland, Ohio, a corporation of Ohio Application August 16, 1949, Serial No. 110,643

1 Claim. (Cl. 73—4)

This invention relates to a testing gauge and more particularly to a gauge for testing the accuracy of pressure gauges which are employed for gauging the pneumatic pressures in inflatable articles such as motor vehicle tires.

In service stations it is customary to employ for inflating vehicle tires apparatus which can be set for a desired tire pressure and which, when the selected pressure has been obtained in the tire being inflated, will automatically cut off the supply of fluid pressure to the airline hose. Apparatus of this type frequently get out of adjustment and become inaccurate, with the result that the tires are not inflated to the desired and selected pressure but are either over-inflated or under-inflated. Also service stations employ for the inflation of vehicle tires air line hoses connected to a source of supply of pressure fluid and in such hoses are located pressure gauges with control means therefor manipulated by the user to selectively connect the tire with the pressure fluid supply source or with the pressure gauge when it is desired to ascertain the pressure to which the tire has been inflated. The air line hoses referred to are subjected to rough usage, being handled by many persons and frequently being dropped or thrown to the ground. The result is that often the pressure gauges in said airline hoses become inaccurate and tires inflated by the use of the hoses are not properly inflated.

Tire wear and long life are largely dependent upon proper inflation of the tire. This is particularly true with respect to the low pressure tires currently used on motor vehicles and also it is especially applicable to large size truck tires. Improper inflation of motor vehicle tires may cause cracking of tire casings and overheating of the tires with resultant blowouts and other tire troubles tending to cause not only inconvenience but in many cases serious accidents.

An object of the invention is to provide an improved and novel testing gauge whereby the accuracy of inflating equipment employed in service stations, garages and other places for inflating vehicle tires can be quickly and easily checked for accuracy, wherefore such equipment if inaccurate may be readjusted or reconditioned to place it in a state of accuracy.

Another object is to provide a testing gauge the use of which will assist in the proper inflation of tires for motor vehicles and will result in longer and more satisfactory tire life and in the reduction of accidents due to tire failures.

A further object is to provide a testing gauge as referred to in the above mentioned objects and which is of simple construction, may be readily used and is accurate and efficient.

Further and additional objects and advantages will become apparent hereinafter during the detailed description of an embodiment of the invention which is to follow.

Referring to the accompanying drawing illustrating an embodiment of the invention, Fig. 1 is a top plan view of a testing gauge embodying the invention with the cover of the gauge casing or box shown fragmentarily and in open position.

Fig. 2 is a longitudinal sectional view through the testing gauge and is taken substantially on line 2—2 of Fig. 1 looking in the direction of the arrows, with the master gauge and its supporting body or block being shown in side elevation and also showing the testing gauge connected to the valve stem of a motor vehicle tire and to the chuck on the end of an inflating airline hose.

Fig. 3 is a fragmentary longitudinal sectional view on a larger scale than Fig. 2 and is taken substantially on line 3—3 of Fig. 1 looking in the direction of the arrows, and shows the master gauge in longitudinal section and the control valve in closed position; the air chuck of the air line hose and the connection between the testing gauge and the valve stem of the tire being indicated by dot and dash lines, and the route of the pressure fluid through the testing gauge being indicated by arrows, and Fig. 4 is a view similar to Fig. 3 but showing the control valve in open position, the air chuck of the airline hose being removed from the gauge and the master gauge in communication with the tire as indicated by arrows.

The testing gauge may be mounted in a suitable protective casing or box indicated in its entirety at 10 and provided with a suitably hinged cover 11 having a flap 12 by means of which the cover 11 may be secured in closed position. In order to secure the cover in closed position the casing 10 may be provided exteriorly on a side wall thereof with snap fastener elements 13 while the flap 12 may have cooperating snap fastener elements 14.

The casing 10 is provided interiorly thereof and intermediate its top and bottom with a supporting shoulder on which bears a plate 15 secured in position by suitable means such as screws 16. The plate 15 adjacent its right hand end as viewed in the drawing supports a gauge block or body 17 which in turn supports the master gauge assembly 18. The body or block 17 is shown as of hexagonal cross section with the flat underside of the body or block resting upon the bottom wall of the casing 10 when the plate 15 and its associated parts are mounted in the casing or box.

The body or block 17 is provided with longitudinally spaced threaded bores 19 and 20 extending vertically part way through the block from the flat upper side thereof and communicating with an elongated longitudinal bore 21 formed in the block. The plate 15 is provided with longitudinally spaced openings registering with the bores 19 and 20 and the threaded end 22 of a fitting 23 extends through one of the openings in the plate and is screwed into the threaded bore 19.

The fitting 23 is provided with a suitable hex wrench receiving head 24 which when the fitting is screwed into position clamps between it and the plate 15 a suitable sealing gasket 25. The fitting 23 is provided with a bore therethrough having a portion shaped and formed to receive a conventional valve core indicated generally at 26. This valve core as is well known in the art comprises a barrel portion having sealing contact with the bore through the fitting, a threaded swivel portion which can be screwed into the fitting and a valve pin extending through the swivel and barrel portions and carrying on its lower end a valve proper that is normally held seated against the valve seat at the lower end of the barrel portion by means of a suitable valve spring.

The threaded end 27 of a fitting 28 is screwed into the bore 20 of the base or block 17 and said fitting is provided with a suitable wrench receiving hex head 29 that clamps between itself and the plate 15 a gasket 30. The fitting 28 is provided with a straight passage or bore therethrough communicating with the longitudinal bore 21 in the base or block 17. The outer end of the fitting 28 is screw-threaded as indicated at 31a. The block or base 17 to the left of the left-hand end of the horizontal longitudinal bore 21, as viewed in the drawing, is provided with a bore 31 extending vertically through the base or block from the flat upper side to the flat lower side thereof and registering with an opening of smaller diameter formed in the plate 15.

A valve plunger 32 is located in the bore 31 and has integrally formed on its upper end a flange 33 of such diameter as to underlie the plate 15 and from which flange projects through the opening in the plate 15 a plunger button 35. A spacer 36 is mounted on the plunger 32 with a cup packing 37 clamped between the flange 33 and the upper end of the spacer 36 and engaging the wall of the bore 31. A similar cup packing 37a is mounted on the lower end of the spacer 36 and is clamped in position by a washer 38 held in place by a suitable rivet-like head on the lower end of the plunger 32. The packings 37 and 37a constitute valve glands while a coil spring 39 located in the bore 31 and abutting the bottom of the casing and the washer 38 normally maintains the plunger in raised position indicated in Fig. 3 at which time the flange 33 is contacting the underside of the plate 15.

When the plunger 32 is in the position indicated in Fig. 3 the space between the valve glands formed by the packings 37 and 37a is in communication with the longitudinal bore 21 by means of a port or orifice 40. The bore 31 communicates by means of a port or orifice 41 with a short longitudinally extending bore 42 formed in the reduced left hand end 43 of the base or body 17. The port 41 when the plunger 32 is held in its normal position indicated in Fig. 3 is below the valve land 37a and hence the ports 40 and 41 are not in communication with each other at such time. However, when the plunger 32 is depressed by pressing of the button 35 to the position shown in Fig. 4 then the ports 40 and 41 are in communication with each other through the space in the bore 31 that is intermediate the valve lands 37 and 37a.

The master gauge unit assembly comprises the cylinder 18 previously referred to which has a supporting and sealing fit on the boss 43 of the block or body 17 as clearly indicated in Figs. 3 and 4. The opposite end of the cylinder 18 is closed by a closure plate 44 which has straight top and bottom edges that contact the underside of the plate 15 and the bottom of the box or casing 10 and support the outer end of the cylinder.

The closure plate 44 is provided with a slot through which projects the gauge bar 45, the said slot acting to guide the bar in its movements. The gauge bar 45 has secured to its upper side a suitably calibrated gauge scale 46 adapted to underlie a suitable lens 47 in an opening formed in the plate 15 and provided with the usual cross line, it being understood that the graduations and indicia on the gauge scale 46 can be read from the upper side of the plate 15 by means of the lens and the cross line.

The gauge bar 45 at its inner or right hand end as viewed in the drawings has an angularly offset portion integral with an end eye portion 48 that is provided with a threaded opening therethrough and into which is screwed the threaded shank 49 of the gauge piston. The shank 49 also has screwed thereon a washer 50 which clamps between it and an integral disk-like flange 51 on the shank 49 a cup-shaped piston packing 52.

Beyond the flange 51 the shank 49 of the piston assembly is provided with an integral head 53 and there is a spacer ring 54 located intermediate the flange 51 and the head 53. A coil gauge spring 55 surrounds the gauge bar 45 and has one end abutting the washer 50 and its other end the closure plate 44.

It will be seen that pressure fluid in the bore 42 of the body or base 17 acts on the piston assembly to move the same toward the left and against the action of the spring 55. It will also be understood that the spring pressure will be suitably selected in relation to gauging pressures and that the gauge bar and the shank 49 can be relatively adjusted to assure accurate indication by the gauge of the fluid pressure to which the piston assembly is subjected.

It will be understood further that when fluid pressure is released from the bore 42 the gauge spring 45 will return the piston assembly and the gauge bar to their most right hand or normal positions.

The manner in which the testing gauge is employed will now be described. A length of flexible tubing or hose 56 has swivelly connected to its opposite ends connected chucks 57, one of which can be screwed to the threaded outer end 31a of the fitting 28 and the other of which can be screwed to the valve stem 59 of a pneumatic tire 60. It will be understood that the chucks 57 will have sealing engagement with the fitting 28 and the valve stem 59 and will be provided with suitable means for engaging the valve pin of the valve core in the valve stem 59 to open the valve thereof.

When the tube or hose 56 is connected as indicated in Fig. 2, the interior of the tire 60 will be in communication with the bore through the fitting 28 and with the bore 21 in the body or base 17. The user of the gauge now applies the customary or usual air chuck 61 that is on the end of the usual air line hose 62 to the outer end of the fitting 23 and the pin in the chuck 61 engages the pin of the valve core 26 and opens the valve thereof.

The air line hose may extend from that type of inflating apparatus wherein a dial or other indicator is set for the desired pressure to which the tire is to be inflated and when said pressure has been obtained the flow of pressure fluid through the apparatus is automatically terminated. On the other hand, the air line hose 62 may be that type wherein an operator-controlled pressure gauge is located.

When the air line hose extends from the type of apparatus first referred to the chuck 61 may be removed as soon as the flow of pressure fluid through the air line hose automatically terminates. When the air line hose 62 is of the type in which a pressure gauge is located the operator when he thinks the tire has been properly inflated manipulates the air line gauge control to determine the pressure in the tire and if it is the required pressure he then removes the chuck 61. Of course in either instance the removal of the chuck 61 allows the valve core 26 to close and then the testing gauge of the present invention functions to indicate if the inflating apparatus or if the air line hose gauge is accurate by testing the actual inflation imparted to the tire 60. This is done by the operator depressing the bottom 35 from the position shown in Fig. 3 to the position shown in Fig. 4, whereupon the ports 40 and 41 are in communication with each other between the lands 37 and 37a of the plunger valve and the fluid pressure in the tire 60 and in the bore 21 is imparted through the bore 42 to the piston assembly of the master gauge to move the latter against the gauge spring 45 with the operator reading the pressure indicated by the gauge scale 46 through the lens 47. If this reading corresponds with the setting of the inflating apparatus or with the reading taken on the air line hose gauge then it is known that said apparatus or said hose gauge is accurate. However, if the readings vary then it is known that the inflating apparatus or the air line hose gauge should be corrected to overcome the discrepancy. Such corrections can be made and the inflating apparatus or the air line hose gauge retested in the manner already described until it is determined by the testing gauge that the apparatus or the hose gauge are accurate.

From the foregoing description it will be seen that the test gauge provides for an efficient and simple device to be utilized in testing the accuracy of inflating apparatus and of air line hose gauges, thus assuring the proper inflation of vehicle tires at service stations, garages and the like.

Although a preferred embodiment of the invention has been illustrated and described herein it will be understood that the invention is susceptible of various modifications and adaptations within the scope of the appended claims.

Having thus described our invention, we claim:

A gauge for testing inflating apparatus or air line gauges comprising an open top elongated box-like container adapted to have a closure member associated therewith, a supporting plate mounted in said container and providing a planular surface accessible from the top of the container and provided with an opening mounting a transparent closure element, a body mounted in said container beneath said plate and extending lengthwise of the container and plate and provided with a bore extending longitudinally of the body and plate, said body being provided with two threaded bores spaced longitudinally of the body and extending transversely to and communicating with said first named bore and being substantially perpendicular to the planular surface of the supporting plate, said plate being provided with openings registering with said two spaced threaded bores, threaded fittings extending through said openings in the plate and screwed into said threaded bores, one of said fittings having its outer end adapted to be connected to the valve stem of an inflatable container such as a vehicle tire, the other of said fittings being internally threaded and shaped to have mounted therein a normally closed valve mechanism and to have applied thereto the chuck of an air line hose which acts to open said valve mechanism, said body being provided beyond said longitudinally extending bore with a valve plunger bore extending perpendicular to said planular surface of said plate and transversely to said longitudinal bore and substantially parallel to said two threaded bores, said plate being provided with an opening registering with said valve plunger bore, said body being provided with a port interconnecting said longitudinal bore and said valve plunger bore and with a second and smaller longitudinal bore and a port interconnecting the second longitudinal bore with said valve plunger bore, a master gauge connected to said body and located in said container beneath said plate and in communication with said second longitudinal bore and including a movable gauge member having a gauge scale thereon located beneath said transparent closure element mounted in said plate, and a plunger valve mounted in said plunger valve bore and controlling communication between said first and second longitudinal bores and including an actuating button extending through the opening in said plate which registers with said plunger valve bore, and spring means normally maintaining said plunger valve in position wherein communication between said first and second longitudinal bores is closed.

RALPH K. BOYER.
HARRY W. KROHN, JR.

REFERENCES CITED

The following references are of record in the file of this patent:

UNITED STATES PATENTS

| Number | Name | Date |
|---|---|---|
| 411,510 | Riley | Sept. 24, 1889 |
| 1,027,834 | Fulmer | May 28, 1912 |
| 1,346,604 | Manning | July 13, 1920 |
| 2,173,619 | Ames | Sept. 19, 1939 |
| 2,491,385 | Marcum | Dec. 13, 1949 |